United States Patent
Herring et al.

(10) Patent No.: US 11,529,887 B2
(45) Date of Patent: Dec. 20, 2022

(54) SYSTEM AND METHOD FOR CONTROLLING A BATTERY MANAGEMENT SYSTEM

(71) Applicant: Toyota Research Institute, Inc., Los Altos, CA (US)

(72) Inventors: Patrick K. Herring, Mountain View, CA (US); Chirranjeevi Balaji Gopal, San Jose, CA (US); Abraham S. Anapolsky, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 455 days.

(21) Appl. No.: 16/751,871

(22) Filed: Jan. 24, 2020

(65) Prior Publication Data

US 2021/0229568 A1    Jul. 29, 2021

(51) Int. Cl.
| | |
|---|---|
| *B60L 58/16* | (2019.01) |
| *G06N 20/00* | (2019.01) |
| *G06N 5/04* | (2006.01) |
| *G07C 5/00* | (2006.01) |
| *H01M 10/42* | (2006.01) |
| *H01M 10/48* | (2006.01) |
| *G07C 5/02* | (2006.01) |

(52) U.S. Cl.
CPC ............ *B60L 58/16* (2019.02); *G06N 5/04* (2013.01); *G06N 20/00* (2019.01); *G07C 5/008* (2013.01); *G07C 5/02* (2013.01); *H01M 10/425* (2013.01); *H01M 10/482* (2013.01); *H01M 2010/4271* (2013.01); *H01M 2220/20* (2013.01)

(58) Field of Classification Search
CPC .......... B60L 58/16; G06N 20/00; G06N 5/04; G07C 5/008; G07C 5/02; H01M 10/425; H01M 10/482; H01M 2010/4271; H01M 2220/20
USPC ............................................. 429/99; 320/109
See application file for complete search history.

(56) References Cited

U.S. PATENT DOCUMENTS

| | | | |
|---|---|---|---|
| 5,739,670 A | * | 4/1998 | Brost .................... H01M 10/48 320/135 |
| 8,629,657 B2 | | 1/2014 | Kishiyama et al. |
| 8,773,066 B2 | | 7/2014 | Kelty |
| 8,907,629 B2 | | 12/2014 | Kelty et al. |

(Continued)

FOREIGN PATENT DOCUMENTS

WO    2019017991 A1    1/2019

*Primary Examiner* — Nathaniel R Pelton
(74) *Attorney, Agent, or Firm* — Christopher G. Darrow; Darrow Mustafa PC

(57) ABSTRACT

A battery management system includes one or more processors, a battery comprising a plurality of cells, an output device, an input device, and a memory having an input module, a battery characteristic prediction module, and an output module. The input module includes instructions that cause the one or more processors to receive a mode selection from a user via the input device. The battery characteristic prediction module includes instructions that cause the one or more processors to predict a characteristic of the battery based on the mode selection using an active machine learning model to predict the characteristic of the battery. The output module includes instructions that cause the one or more processors to output an estimated cost to the output device based on the characteristic of the battery determined by the active machine learning model.

15 Claims, 5 Drawing Sheets

(56) References Cited

U.S. PATENT DOCUMENTS

| | | |
|---|---|---|
| 8,975,866 B2 | 3/2015 | McGrath et al. |
| 9,868,360 B2 | 1/2018 | Smidebrant et al. |
| 10,195,948 B2 | 2/2019 | O'Hara et al. |
| 10,807,493 B1 * | 10/2020 | Reeves ................. B60L 3/12 |
| 2009/0326749 A1 * | 12/2009 | Uchida ................ B60L 53/305 |
| | | 320/109 |
| 2010/0305798 A1 | 12/2010 | Phillips et al. |
| 2015/0191098 A1 | 7/2015 | Chang et al. |
| 2019/0113577 A1 * | 4/2019 | Severson .......... H01M 10/0525 |
| 2019/0143832 A1 | 5/2019 | Birek et al. |
| 2019/0176639 A1 | 6/2019 | Kumar et al. |
| 2020/0292624 A1 * | 9/2020 | Tajima ................ G01R 31/387 |

* cited by examiner

400
SYSTEM AND METHOD FOR CONTROLLING A BATTERY MANAGEMENT SYSTEM

TECHNICAL FIELD

The subject matter described herein relates, in general, to systems and methods for controlling a battery management system ("BMS" or "BMS system"), especially a BMS system of a vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles utilize electrical propulsion systems, such as battery electric vehicles ("BEV") and plug-in hybrid electric vehicles ("PHEV"), and the like, may have some advantages over there non-electrical vehicle counterparts, such as reduced consumption of hydrocarbon-based fuels, improved performance due to the high torque output of the electrical propulsion systems, and other advantages.

However, one area of concern for these types of vehicles relates to the degradation of the battery of the vehicle. For example, with regard to lithium-ion batteries, lithium-ion batteries work on ion movement between the positive and negative electrodes. In theory, such a mechanism should work forever, but cycling, elevated temperature, and other factors decrease the performance over time.

SUMMARY

This section generally summarizes the disclosure and is not a comprehensive explanation of its full scope or all its features.

In one embodiment, a battery management system includes one or more processors, a battery comprising a plurality of cells, an output device, an input device, and a memory having an input module, a battery characteristic prediction module, and an output module. The input module includes instructions that cause the one or more processors to receive a mode selection from a user via the input device. The battery characteristic prediction module includes instructions that cause the one or more processors to predict a characteristic of the battery based on the mode selection using an active machine learning model to predict the characteristic of the battery. The output module includes instructions that cause the one or more processors to output an estimated cost to the output device based on the characteristic of the battery determined by the active machine learning model.

In another embodiment, a method for managing a battery management system includes the steps of receiving a mode selection from a user via an input device, predicting a characteristic of a battery based on the mode selection by utilizing an active machine learning model, and outputting an estimated cost to an output device based on the characteristic of the battery determined by the active machine learning model.

In another embodiment, a non-transitory computer-readable medium for managing a battery management system includes instructions that when executed by one or more processors cause the one or more processors to receive a mode selection from a user via an input device, predict a characteristic of a battery based on the mode selection by utilizing an active machine learning model, and output an estimated cost to an output device based on the characteristic of the battery determined by the active machine learning model.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a BMS system that may be within a vehicle, such as a BEV or PHEV. The BMS system includes at least one processor that is in communication with a battery that includes a plurality of cells. The BMS system may receive, as an input, a mode selection from a user of the vehicle. A battery characteristic module causes the at least one processor to predict a characteristic of the battery based on the mode selection. The battery characteristic module utilizes an active learning model that has one or more model weights to predict a characteristic of the battery based on the mode selection.

Once the characteristic of the battery has been determined, the one or more processors may output via an output device an estimated cost based on the characteristic of the battery determined by the active learning model. The estimated cost could be an indication to the user regarding how their mode selection impacts the range of the vehicle, the life of the battery, and/or other battery-related characteristics. Once receiving the estimated cost, the user may determine to change their mode selection to either increase the range of the vehicle, increase the life of the battery, or change other battery-related characteristics.

The active learning model, as stated before, uses one or more model weights to predict a characteristic of the battery. The BMS system also has a network access device that allows the BMS system to receive updated model weights from a cloud-based server. Once the updated model weights are received, the BMS system can update the active machine learning model to consider the updated model weights from the central server. The updated model weights may be generated by training an active machine learning model on a cloud-based system. The cloud-based system has the ability to receive from numerous BMS systems data related to the performance and characteristics of batteries and, therefore, can update and train the active machine learning model and generate updated model weights to later disseminate to other battery management systems that have been deployed.

Figure 1:
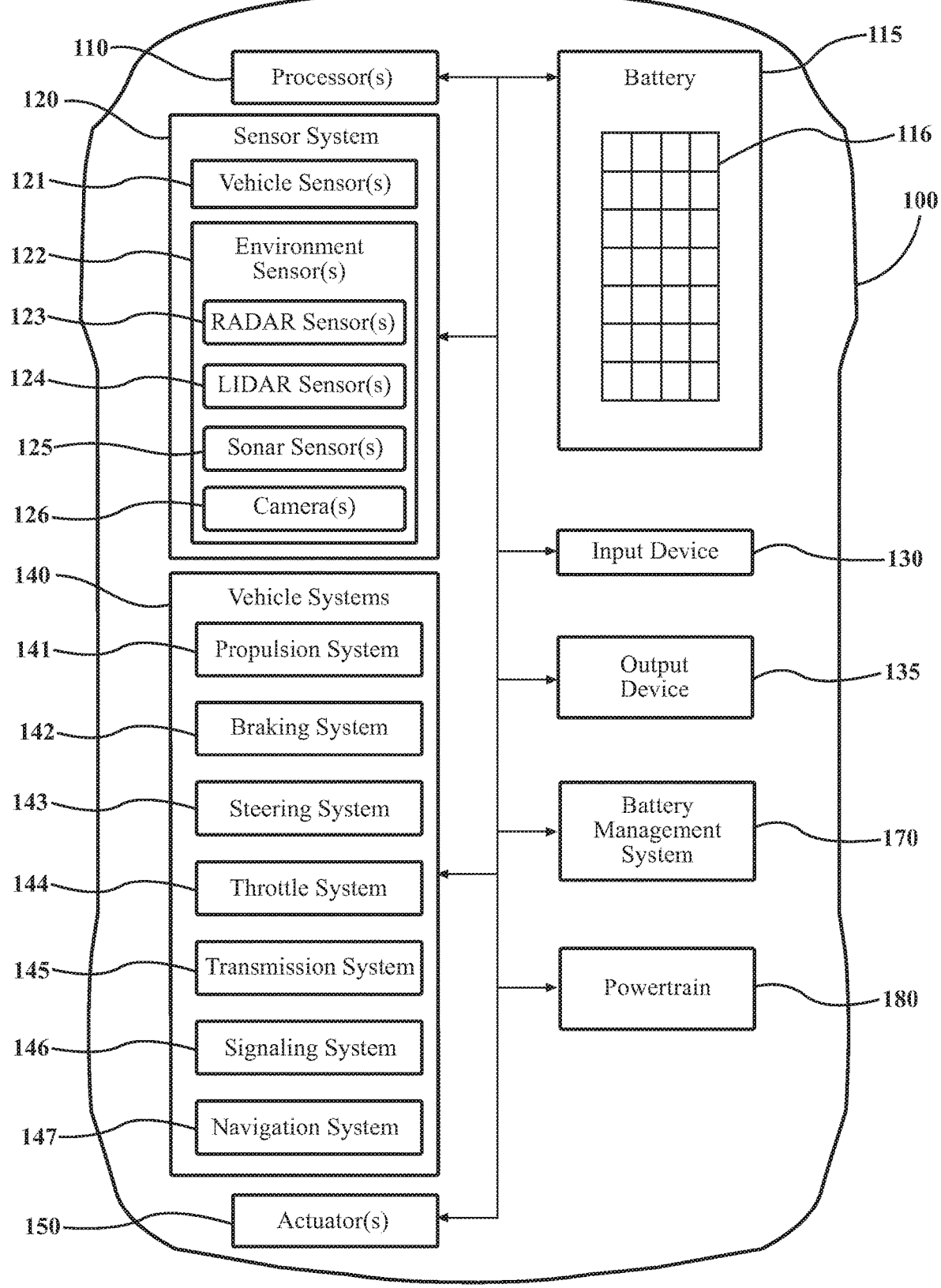
FIG. 1 illustrates a vehicle incorporating one example of a battery management system.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

The vehicle 100 may be a vehicle that includes a battery 115 that is formed by a plurality of cells 116. The battery 115 can be any type of device having one or more cells 116 with external connections for powering one or more systems or subsystems of the vehicle 100. In one example, the vehicle 100 is either a BEV vehicle or a PHEV vehicle that includes a powertrain 180. The powertrain 180 may include one or more electrical motors that by receiving power from the battery 115 can provide torque to one or more wheels of the vehicle 100. The management of the battery 115 may be performed by a BMS system 170, which will be described in detail later in this specification.

The vehicle 100 also includes various elements. It will be understood that in various embodiments it may not be necessary for the vehicle 100 to have all the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. The embodiments described herein may be practiced using various combinations of these elements.

Figure 2:
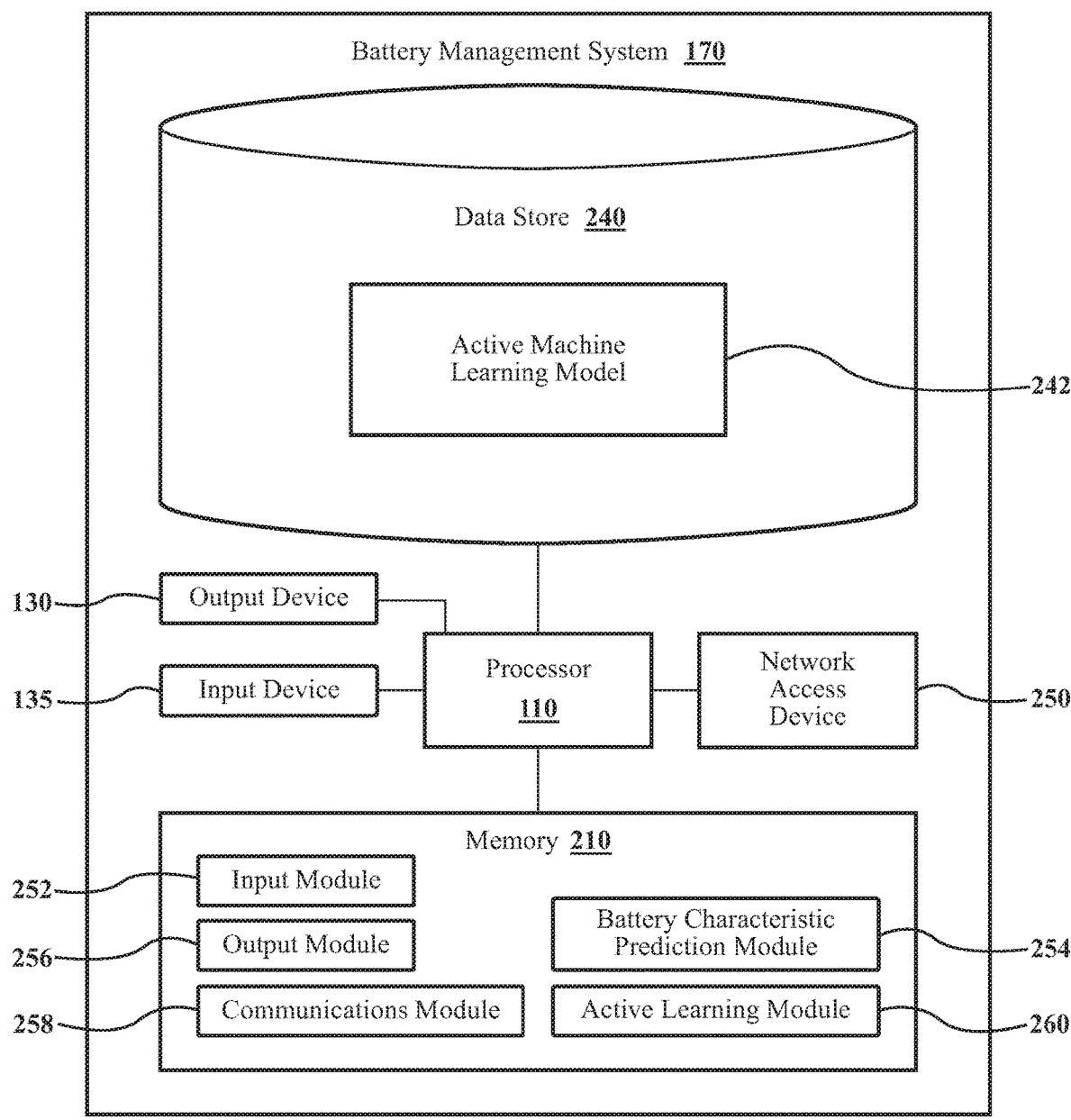
FIG. 2 illustrates a more detailed view of the battery management system of FIG. 1.

In either case, the vehicle 100 includes the BMS system 170 for managing the battery 115 of the vehicle 100. With reference to FIG. 2, one embodiment of the BMS system 170 is further illustrated. As shown, the BMS system 170 includes a processor(s) 110. Accordingly, the processor(s) 110 may be a part of the BMS system 170, or the BMS system 170 may access the processor(s) 110 through a data bus or another communication path. In one or more embodiments, the processor(s) 110 is an application-specific integrated circuit that is configured to implement functions associated with an input module 252, a battery characteristic prediction module 254, an output module 256, a communications module 258, and/or an active learning module 260.

In general, the processor(s) 110 is an electronic processor such as a microprocessor that can perform various functions as described herein. In one embodiment, the BMS system 170 includes a memory 210 that stores the input module 252, the battery characteristic prediction module 254, the output module 256, the communications module 258, and/or the active learning module 260. The memory 210 is a random-access memory (RAM), read-only memory (ROM), a hard disk drive, a flash memory, or other suitable memory for storing the modules 252, 254, 256, 258, and/or 260. The modules 252, 254, 256, 258, and/or 260 are, for example, computer-readable instructions that, when executed by the processor(s) 110, cause the processor(s) 110 to perform the various functions disclosed herein.

Furthermore, in one embodiment, the BMS system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 252, 254, 256, 258, and/or 260 in executing various functions. In one embodiment, the data store 240 includes an active machine learning model 242 that utilizes one or more model weights to determine one or more characteristics of the battery 115. The active machine learning model 242 is a trained model. Any one of several different machine learning models could be utilized, such as artificial neural networks, decision trees, support vector machines, regression analysis, Bayesian networks, and the like.

The vehicle 100 can include an input device 135. An "input device" includes any device, component, system, element, or arrangement or groups thereof that enable information/data to be entered into a machine. The input device 135 can receive an input from a vehicle passenger (e.g., a driver or a passenger). The vehicle 100 can include an output device 130. An "output device" includes any device, component, or arrangement or groups thereof that enable information/data to be presented to a vehicle passenger (e.g., a person, a vehicle passenger, etc.).

The BMS system 170 may also include a network access device 250 that is in communication with the processor(s) 110. The network access device 250 should be understood to include any one of several different hardware and/or software components that allow the processor(s) 110 and, therefore, the BMS system 170 to communicate with external systems. The communication with external systems may be via a wired or wireless communication methodology via a distributed network, such as the Internet. However, it should be understood that any one of several different methodologies for connecting the processor(s) 110 with an external device could be utilized.

Figure 4:
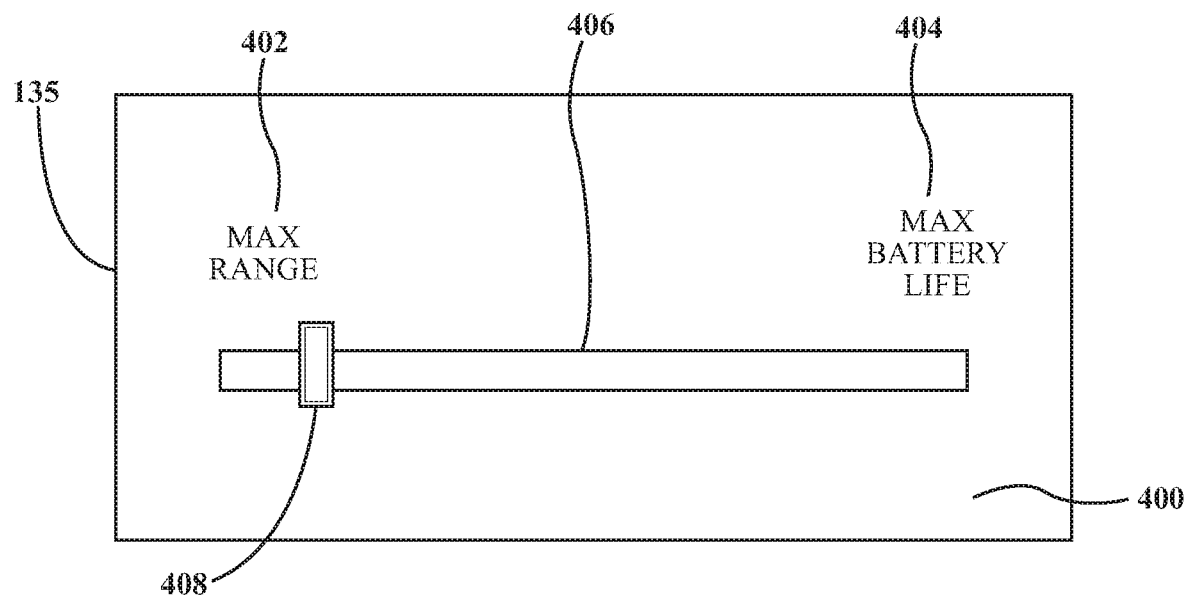
FIG. 4 illustrates an example of a user interface for selecting a mode from a user.

Accordingly, the input module 252 includes instructions that, when executed by the processor(s) 110, causes the processor(s) 110 to receive a mode selection from a user via the input device 135. In one example, referring to FIG. 4, the input device 135 may be a touchscreen 400 that allows a user to select a mode selection. The example given in FIG. 4 is only an example. Any one of several different methodologies could be used to receive a mode selection from a user. In this example, the mode selection is performed by utilizing a slider 406 that includes a slider bar 408. The slider 406 extends between a maximum range mode selection 402 and a maximum battery life mode selection 404.

The maximum range mode selection 402 is representative of a mode selection that indicates that the user wishes to have the maximum range possible by the battery 115. As such, in this type of situation, the BMS system 170 will allow the battery 115 to charge to its maximum capacity. Conversely, with regards to the maximum battery life mode selection 404, this is representative of a mode selection that indicates that the user wishes to extend the battery life of the battery 115 as much as possible. In this type of situation, the BMS system 170 may put limitations on the battery 115 regarding how often the battery 115 is charged, the maximum amount that the battery 115 is charged, etc.

The battery characteristic prediction module 254 includes instructions that, when executed by the processor(s) 110, cause the processor(s) 110 to predict a characteristic of the battery 115 based on the mode selection. The battery characteristic prediction module utilizes the active machine learning model 242 to predict the characteristic of the battery. As stated before, the active machine learning model 242 may utilize one or more model weights obtained by training the active machine learning model on the external system, such as a cloud-based system, which will be described later in this specification.

Additionally or alternatively, it should be understood that the battery characteristic determined by the battery characteristic prediction module 254 may rely on other factors than the mode selection. For example, the battery characteristic prediction module 254 may include instructions that cause the processor(s) 110 to predict the characteristic of the battery 115 based on a driving style of the user. The driving style of the user may be indicative of one or more driving characteristics of the user when operating the vehicle 100. The driving characteristics of the user may include the historical distance that the vehicle 100 typically travels between destinations, a historical speed of the vehicle 100, and a charging history of the battery 115 of the vehicle. This information may be utilized by the active machine learning model 242 to determine one or more characteristics of the battery 115 and, therefore, be utilized to determine the estimated cost.

The active machine learning model 242, as explained earlier, uses one or more model weights for determining the characteristic of the battery 115. The active machine learning model 242 and the one or more model weights for determining a characteristic of the battery 115 can be generated by training and active machine learning model 242 on an external system and then providing these updated model weights to the BMS system 170 of the vehicle 100. With regards to the active machine learning model 242, any one of several different active machine learning models for predicting one or more characteristics of the battery 115 can be utilized. For example, one type of machine learning model that may be utilized to determine one or more characteristics of the battery 115 could include the predictive modeling described in U.S. Pat. Pub. No. 2019/0113577 entitled "Data-driven Model for Lithium-ion Battery Capacity Fade and Lifetime Prediction" to Severson et al., which is hereby incorporated by reference in its entirety.

The output module 256 may include instructions that, when executed by the processor(s) 110, cause the processor(s) 110 to output an estimated cost to the output device 130 based on the characteristic of the battery 115 determined by the active machine learning model 242. The estimated cost may be a representation of how the mode selection selected by the user impacts the cycle life of the battery 115. The cycle life of the battery 115 may be a number of cycles until 80% of the nominal capacity of the battery 115 remains.

Figure 5:
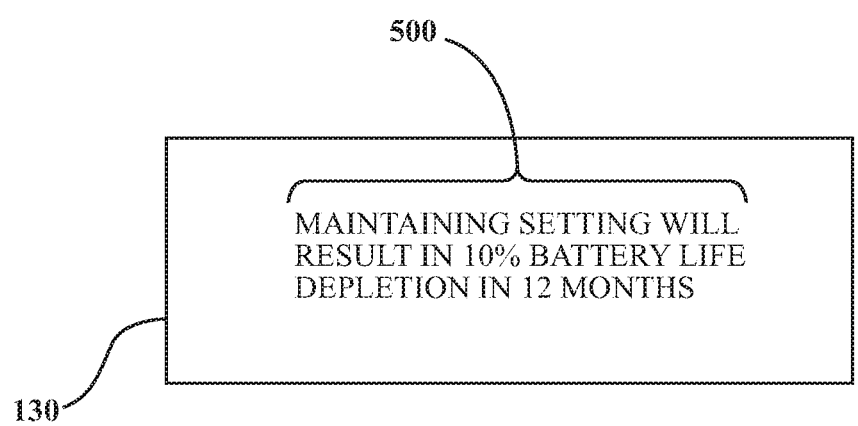
FIG. 5 illustrates an example of a user interface outputting an estimated cost to the user.

For example, referring to FIG. 5, one example of an estimated cost 500 outputted by the output device 130 is shown. In this example, because the user move the slider bar 408 towards a maximum range mode selection 402 as shown in FIG. 4, the battery characteristic prediction module 254 using the active machine learning model 242 has determined a 10% loss of battery life in 12 months if the mode selection is maintained. The example of the estimated cost 500 outputted by the output device 130 is just an example, and any one of several different methodologies for outputting the estimated cost could be utilized.

Figure 3:
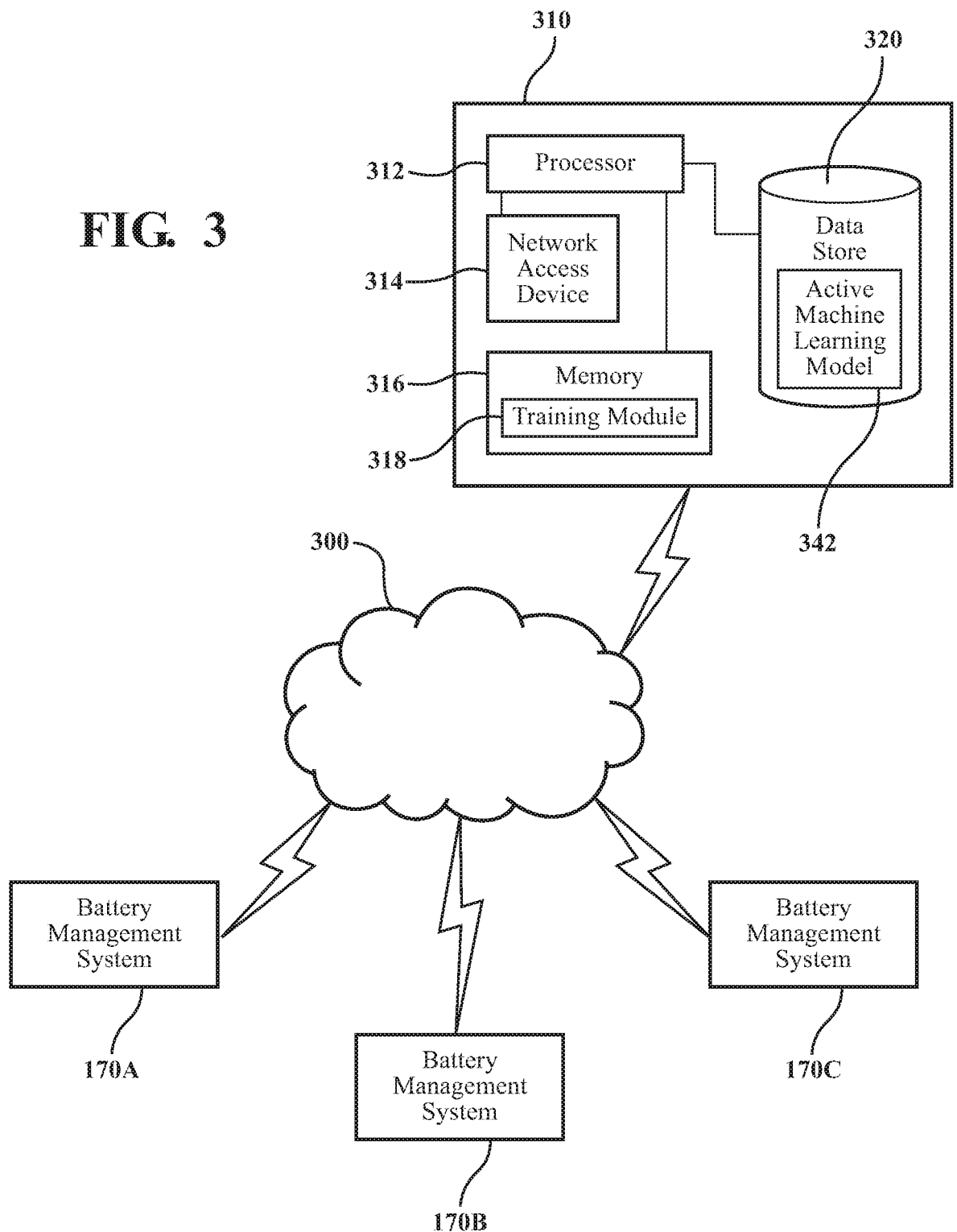
FIG. 3 illustrates an example of updating the active machine learning model of the battery management system with model weights from a cloud-based server.

As stated before, the active machine learning model utilizes one or more model weights to determine one or more characteristics of the battery 115. The active machine learning model 242 may be updated from time to time with updated model weights that have been generated by training another active machine learning model on an external system, such as a cloud-based server. For example, referring to FIG. 3, illustrated are three BMS systems 170A, 170B, and 170C. Any one of a number of BMS systems may be utilized and that this is merely an example to illustrate how the active machine learning model is trained by an external device.

Here, an external device 310, which may be a cloud-based server, includes one or more processor(s) 312. The processor(s) 312 is in communication with a network access device 314, which allows for communication with the BMS systems 170A, 170B and/or 170C via a network 300, which may be a distributed network, such as the Internet. The network access device 314 can be any one of a number of different hardware and/or software that allows the external device 310 to communicate with the network 300 and, therefore, the BMS systems 170A, 170B, and/or 170C.

One or more processor(s) 312 may be in communication with the memory 316, which may be any type of memory capable of storing electronic information. The memory 316 may be similar to the memory 210 previously described in this specification. The memory 316 includes a training module 318 that causes the processor(s) 312 to train an active machine learning model 342 that may be stored on a data store 320. The data store 320 is in communication with the processor(s) 312 and may be similar to the data store 240 previously described.

The training module 318 causes the processor(s) 312 to train the active machine learning model 342 and therefore generates updated model weights. The training sets for training the active machine learning model 342 may come from several different sources. These sources could include observations made by BMS systems that are currently being deployed, such as BMS systems 170A, 170B, and/or 170C. As the active machine learning model 342 is trained and therefore generates updated model weights, these model weights can be disseminated to one or more BMS systems, such as the BMS systems 170A, 170B, and/or 170C.

Referring back to FIG. 2, the communications module 258 may include instructions that, when executed by the processor(s) 110, cause the processor(s) 110 to receive updated model weights from an external device, such as the external device 310. Additionally or alternatively, the communications module 258 may also include instructions that, when executed by the processor(s) 110, cause the processor(s) 110 to transmit battery-related information to the external device 310 using the network access device 250. This battery-related information may be utilized by the external device 310 to train the active machine learning model 342.

The active learning module 260 includes instructions that, when executed by the processor(s) 110, causes the processor(s) 110 to update the active machine learning model 242 of the BMS system 170 with any updated model weights received from the external device 310. By so doing, the active machine learning model 242 of the BMS system 170 can be updated periodically with improved model weights to improve the active machine learning model 242 over time. By utilizing an external device, such as the external device 310, to remotely generate model weights by training the active machine learning model 342, the active machine learning model 242 of the BMS system 170 can be continuously updated and improved over time.

Figures 6, 7:
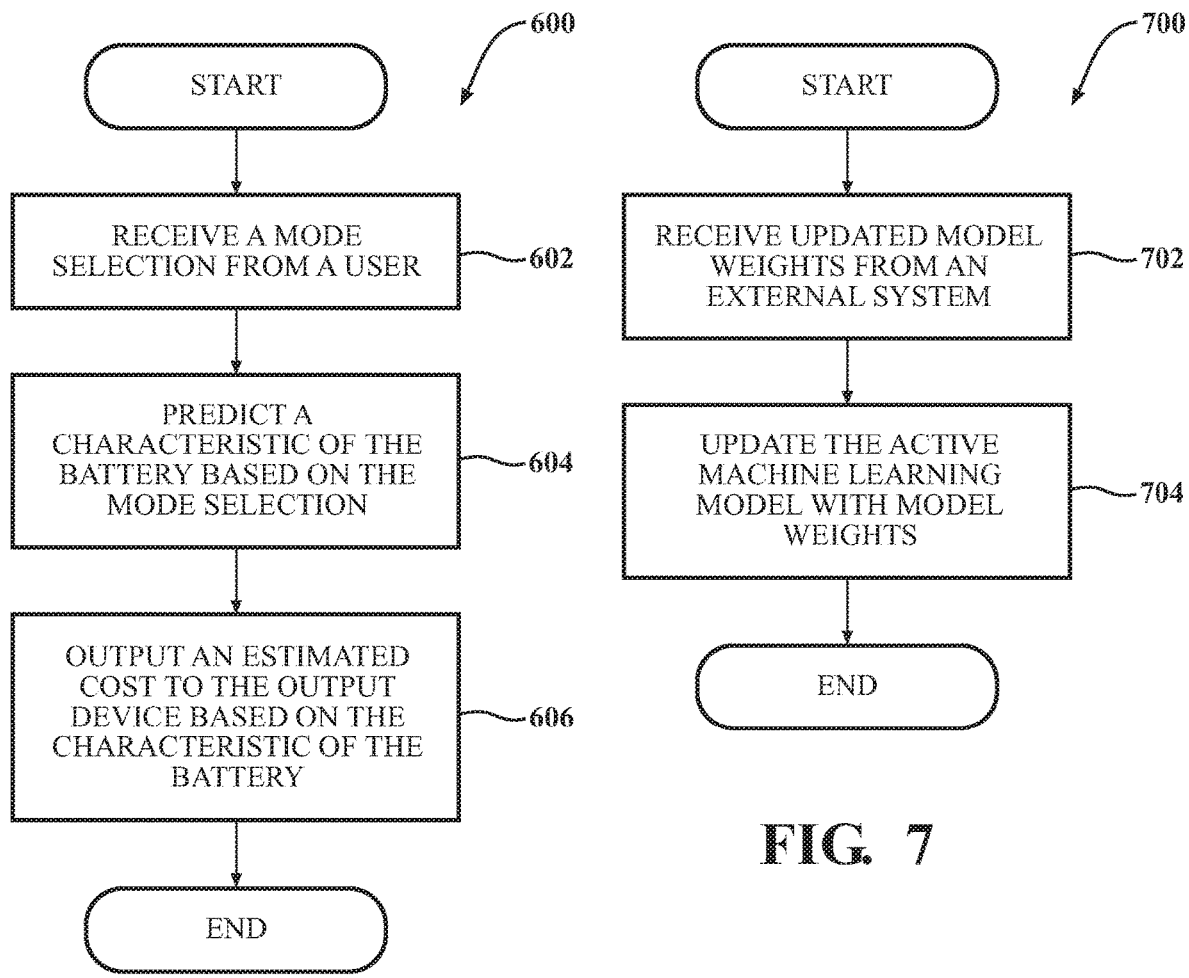
FIG. 6 illustrates a method for controlling a battery management system.
FIG. 7 illustrates a method for updating the active learning model of the battery management system with model weights from a cloud-based server.

Referring to FIG. 6, a method 600 for controlling a BMS system is shown. The method 600 will be described from the viewpoint of the vehicle 100 of FIG. 1 and the BMS system 170 of FIG. 2. However, this is just one example of implementing the method 600. While method 600 is discussed in combination with the BMS system 170, it should be appreciated that the method 600 is not limited to being implemented within the BMS system 170 but is instead one example of a system that may implement the method 600.

The method 600 begins at step 602, wherein the input module 252 causes the processor(s) 110 to receive a mode selection from a user. The mode selection from the user may be inputted to the input device 135 using a user interface. The user interface may be similar to the user interface illustrated in FIG. 4 and previously described in the paragraphs above. The mode selection from the user may include a range maximization mode, wherein the range of the vehicle 100 is maximized, or a battery life maximization mode, wherein the battery life of the battery 115 of the vehicle is maximized.

In step 604, the battery characteristic prediction module 254 causes the processor(s) 110 to predict a characteristic of the battery 115 based on the mode selection previously received in step 602. The prediction of the characteristic of the battery 115 is performed by an active machine learning model 242, which utilizes one or more model weights to determine one or more characteristics of the battery 115 based on the mode selection.

In step 606, the output module 256 causes the processor(s) 110 to output an estimated cost to the output device 130 based on the characteristic of the battery 115 previously determined in step 604. In one example, the estimated cost may provide information to the user regarding the impact that the mode selection will have on the range of the vehicle 100 and/or the battery life of the battery 115 of the vehicle. An example of the estimated cost being output by the output device 130 is shown in FIG. 5 and was previously described in the paragraphs above.

As stated before, the ability to predict a characteristic of the battery 115 is based, at least in part, on the active machine learning model 242, which utilizes one or more model weights. These model weights may have been generated by an external device, such as a cloud-based server that was trained using one or more training data sets.

Referring to FIG. 7, a method 700 for updating the active machine learning model, such as the active machine learning model 242 of the BMS system 170 is shown. The method 700 will be explained from the perspective of the BMS system 170, but this is just about one example of performing the method 700.

In step 702, the communications module 258 causes the processor(s) 110 to receive updated model weights from the external system. The external system may be the external device 310 of FIG. 3. The updated model weights may be generated by the external device 310 by training the active machine learning model 342 on the external device 310. As the active machine learning model 342 on the external device 310 is trained, updated model weights are generated. These updated model weights may then be transmitted from the external device 310 to the BMS system 170 and routed to the processor(s) 110.

In step 704, the active learning module 260 causes the processor(s) 110 to update the active machine learning model 242 of the BMS system 170 with the updated model weights. By so doing, the active machine learning model 242 can be continuously updated and improved upon to be able to better predict one or more characteristics of the battery 115 of the vehicle 100.

FIG. 1 will now be discussed in full detail as an example environment within which the system and methods disclosed herein may operate. In one or more embodiments, the vehicle 100 may be an autonomous vehicle, semi-autonomous vehicle, or nonautonomous vehicle. The vehicle 100 can include one or more processor(s) 110. In one or more arrangements, the processor(s) 110 can be a main processor of the vehicle 100. For instance, the processor(s) 110 can be an electronic control unit (ECU). The term "operatively connected" and/or "in communication with" as used throughout this description, can include direct or indirect connections, including connections without direct physical contact.

The vehicle 100 can include the sensor system 120. The sensor system 120 can include one or more sensors. "Sensor" means any device, component and/or system that can detect and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110 and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include the vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the vehicle sensor(s) 121. However, it will be understood that the embodiments are not limited to the particular sensors described. As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A battery management system comprising:
   one or more processors;
   a battery comprising a plurality of cells, the battery being in communication with the one or more processors;
   an output device in communication with the one or more processors;
   an input device in communication with the one or more processors;
   a memory in communication with the one or more processors the memory having an input module, a battery characteristic prediction module, and an output module;
   wherein the input module includes instructions that, when executed by the one or more processors, cause the one or more processors to receive a mode selection from a user via the input device, the mode selection includes a selection between extending a driving range of the vehicle and increasing cycle life of the battery;
   wherein the battery characteristic prediction module includes instructions that, when executed by the one or more processors, cause the one or more processors to predict a characteristic of the battery based on the mode selection, wherein the battery characteristic prediction module utilizes an active machine learning model to predict the characteristic of the battery, wherein the characteristic of the battery is a cycle life of the battery; and
   wherein the output module includes instructions that, when executed by the one or more processors, cause the one or more processors to output an estimated cost to the output device based on the characteristic of the battery determined by the active machine learning model, the estimated cost being a prediction how the selection of mode selection impacts the driving range of the vehicle and the cycle life of the battery.

2. The battery management system of claim 1, wherein the cycle life of the battery is a number of cycles until 80% of a nominal capacity of the battery.

3. The battery management system of claim 1, further comprising:
   a network access device in communication with the one or more processors;
   wherein the memory further comprises a communications module having instructions that, when executed by the one or more processors, cause the one or more processors to receive updated model weights from an external system via the network access device; and
wherein the memory further comprises an active learning module having instructions that, when executed by the one or more processors, cause the one or more processors to update the active machine learning model with model weights obtained by training the active machine learning model on the external system.

4. The battery management system of claim 1, wherein the battery management system is mounted within a vehicle.

5. The battery management system of claim 4, wherein the battery characteristic prediction module includes instructions that, when executed by the one or more processors, cause the one or more processors to predict the characteristic of the battery based on the mode selection and a driving style of the user, the driving style of the user indicating one or more driving characteristics of the user when operating the vehicle.

6. The battery management system of claim 5, wherein the one or more driving characteristics includes a historical distance the vehicle travels between destinations, a historical speed of the vehicle, and a charging history of the battery of the vehicle.

7. A method for managing a battery management system comprising the steps of:
receiving, by one or more processors, a mode selection from a user via an input device, the mode selection includes a selection between extending a driving range of the vehicle and increasing cycle life of the battery;
predicting, by the one or more processors, a characteristic of a battery based on the mode selection by utilizing an active machine learning model, the battery comprising a plurality of cells, wherein the characteristic of the battery is a cycle life of the battery; and
outputting, by the one or more processors, an estimated cost to an output device based on the characteristic of the battery determined by the active machine learning model, the estimated cost being a prediction how the selection of mode selection impacts the driving range of the vehicle and the cycle life of the battery.

8. The method for managing the battery management system of claim 7, wherein the cycle life of the battery is a number of cycles until 80% of a nominal capacity of the battery.

9. The method for managing the battery management system of claim 7, further comprising the steps of
receiving, by the one or more processors via a network access device, updated model weights from an external system via the network access device; and
updating, by the one or more processors, the active machine learning model with model weights obtained by training the active machine learning model on the external system.

10. The method for managing the battery management system of claim 7, wherein the battery management system is mounted within a vehicle.

11. The method for managing the battery management system of claim 10, further comprising the step of predicting the characteristic of the battery based on the mode selection and a driving style of the user, the driving style of the user indicating one or more driving characteristics of the user when operating the vehicle.

12. The method for managing the battery management system of claim 11, wherein the one or more driving characteristics includes a historical distance the vehicle travels between destinations, a historical speed of the vehicle, and a charging history of the battery of the vehicle.

13. A non-transitory computer-readable medium for controlling a battery management system, the non-transitory computer-readable medium comprising instructions that when executed by one or more processors cause the one or more processors to:
receive a mode selection from a user via an input device, the mode selection includes a selection between extending a driving range of the vehicle and increasing cycle life of the battery;
predict a characteristic of a battery based on the mode selection by utilizing an active machine learning model, the battery comprising a plurality of cells, wherein the characteristic of the battery is a cycle life of the battery; and
output an estimated cost to an output device based on the characteristic of the battery determined by the active machine learning model, the estimated cost being a prediction how the selection of mode selection impacts the driving range of the vehicle and the cycle life of the battery.

14. The non-transitory computer-readable medium of claim 13, wherein the cycle life of the battery is a number of cycles until 80% of a nominal capacity of the battery.

15. The non-transitory computer-readable medium of claim 13, further comprising instructions that when executed by the one or more processors cause the one or more processors to:
receive, via a network access device, updated model weights from an external system via the network access device; and
update the active machine learning model with model weights obtained by training the active machine learning model on the external system.

* * * * *